United States Patent
Etchason

(10) Patent No.: US 9,062,745 B2
(45) Date of Patent: Jun. 23, 2015

(54) AUTOMATIC TRANSMISSION WITH IMPROVED GEAR ARRANGEMENT

(71) Applicant: Allison Transmission Inc., Indianapolis, IN (US)

(72) Inventor: Edmond M. Etchason, New Palestine, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 151 days.

(21) Appl. No.: 13/715,131

(22) Filed: Dec. 14, 2012

(65) Prior Publication Data

US 2013/0157796 A1 Jun. 20, 2013

Related U.S. Application Data

(60) Provisional application No. 61/577,262, filed on Dec. 19, 2011.

(51) Int. Cl.
| | |
|---|---|
| *F16H 3/62* | (2006.01) |
| *F16H 37/06* | (2006.01) |
| *F16H 3/66* | (2006.01) |
| *F16H 59/36* | (2006.01) |

(52) U.S. Cl.
CPC ........ *F16H 3/62* (2013.01); *F16H 59/36* (2013.01); *F16H 3/66* (2013.01); *F16H 2200/0056* (2013.01); *F16H 2200/2012* (2013.01); *F16H 2200/2046* (2013.01)

(58) Field of Classification Search
CPC .............................................. F16H 2200/2012
USPC ......... 475/275, 279, 286, 290, 317, 323, 329, 475/330
See application file for complete search history.

(56) References Cited

U.S. PATENT DOCUMENTS

| | | | | | |
|---|---|---|---|---|---|
| 3,811,343 | A | * | 5/1974 | Mori et al. | 475/285 |
| 3,987,690 | A | * | 10/1976 | Murakami et al. | 475/276 |

(Continued)

FOREIGN PATENT DOCUMENTS

| | | |
|---|---|---|
| EP | 2167843 B1 | 9/2011 |
| KR | 10-0793887 | 1/2008 |

OTHER PUBLICATIONS

Of the ISA/KR: "Notification of Transmittal of the International Search Report and The Written Opinion of the International Searching Authority, or the Declaration" and "Written Opinion of the International Searching Authority"; Dated: Apr. 24, 2013, pp. 1-9.

*Primary Examiner* — Tisha Lewis

(74) *Attorney, Agent, or Firm* — Stephen F. Rost, Esq.; Taft Stettinius & Hollister LLP

(57) ABSTRACT

The present disclosure provides an automatic transmission having an input adapted to couple to a torque-generating mechanism and an output coupled to the input. The transmission also includes a first rotating torque-transferring mechanism disposed along a first torque path and coupled to the input. A second rotating torque-transferring mechanism is disposed along a second torque path and is coupled to the input independent of the first torque-transferring mechanism. The transmission includes a plurality of stationary torque-transferring mechanisms, each of which is disposed between the input and output. The transmission includes a first planetary gearset, a second planetary gearset, a third planetary gearset, and a fourth planetary gearset, where each gearset includes a sun gear, a ring gear, and a carrier assembly. Moreover, the carrier assembly of the third planetary gearset is coupled to the output and the sun gear of the fourth planetary gearset.

6 Claims, 3 Drawing Sheets

(56) References Cited

U.S. PATENT DOCUMENTS

| | | |
|---|---|---|
| 7,364,527 B2 | 4/2008 | Klemen |
| 2005/0113205 A1 | 5/2005 | Oguri et al. |
| 2008/0207383 A1* | 8/2008 | Kato et al. .................. 475/276 |
| 2010/0240489 A1 | 9/2010 | Carey et al. |

* cited by examiner

AUTOMATIC TRANSMISSION WITH IMPROVED GEAR ARRANGEMENT

RELATED APPLICATIONS

This application claims priority to U.S. Provisional Patent Application Ser. No. 61/577,262, filed Dec. 19, 2011, which is hereby incorporated by reference in its entirety.

FIELD OF THE DISCLOSURE

The present disclosure relates to a gear arrangement for a transmission, and in particular to a planetary gear arrangement for an automotive transmission having a Polak gear arrangement.

BACKGROUND

A conventional transmission for a powered vehicle can include a gearbox, i.e., gears, synchronizers, dog clutches, clutch plates and reaction plates, a number of automatically selectable gears, planetary gear sets, hubs, pistons, shafts, and other housings. The clutches can be stationary brakes/clutches or rotating clutches. The transmission can have an internal shaft which rotates one or more clutches or shafts in the transmission.

The number of clutches and gear schemes can be used to achieve different gear ratios. Each gear ratio can define a range in which the transmission operates. A higher numerical gear ratio, for example, can be achieved at a lower transmission output speed. This can be important if a vehicle is heavily loaded or requires higher torque to ascend an elevation, for instance. Alternatively, a lower numerical gear ratio can be achieved at a higher transmission output speed, particularly when a vehicle is travelling at higher speeds on a highway. The lower numerical gear ratio can help increase fuel efficiency at these speeds.

To achieve different gear ratios, gear schemes are configured in which brakes, clutches, shafts, and gearsets are packaged in a transmission. The gear scheme can include one or more planetary gearsets. A planetary gearset can include a sun gear, a ring gear, and a carrier. One or more of the sun gear, ring gear, and carrier can be input or output of the planetary gearset. The manner in which torque is transmitted through the clutches and gearsets determines the different gear ratios for a given transmission.

In some arrangements, however, a gear step between shifts precludes the shift from being done automatically. Instead, a vehicle operator may have to manually shift the transmission from one gear ratio to the next with the throttle released because the gear step is too large. Gear step is defined as the ratio between gear ratios. In transmissions that include a torque converter and lockup clutch, it may also be difficult to apply the lockup clutch due to the increased gear step.

There is a need for a seven-speed, automatic transmission having a gear arrangement for automatically selecting gears and which the gearbox is configured for minimizing gear step between gear ratios for forward and reverse ranges.

SUMMARY

In an exemplary embodiment of the present disclosure, an automatic transmission includes an input adapted to couple to a torque-generating mechanism and an output coupled to the input. The transmission also includes a first rotating torque-transferring mechanism disposed along a first torque path such that the first rotating torque-transferring mechanism is coupled to the input. A second rotating torque-transferring mechanism is disposed along a second torque path such that the second rotating torque-transferring mechanism is coupled to the input independent of the first torque-transferring mechanism. Moreover, the transmission includes a first stationary torque-transferring mechanism, a second stationary torque-transferring mechanism, a third stationary torque-transferring mechanism, and a fourth stationary torque-transferring mechanism, each of which is disposed between the input and the output. The transmission further includes a first planetary gearset, a second planetary gearset, a third planetary gearset, and a fourth planetary gearset, where each gearset includes a sun gear, a ring gear, and a carrier assembly. The carrier assembly of the third planetary gearset is coupled to the output and the sun gear of the fourth planetary gearset.

In one form of this embodiment, the ring gear of the fourth planetary gearset is coupled to the ring gear of the third planetary gearset. In another form thereof, a third torque path is at least partially defined by the input, the sun gear of the first planetary gearset, and the carrier assembly of the first planetary gearset. In a further form of this embodiment, the first torque path is at least partially defined by the input, the first rotating torque-transferring mechanism, the sun gear of the second planetary gearset, and the sun gear of the third planetary gearset. The second torque path is at least partially defined by the input, the second rotating torque-transferring mechanism, and the carrier assembly of the second planetary gearset.

In one aspect of this embodiment, the input and output are disposed along the same centerline. In another aspect, the carrier assembly of the first planetary gearset is coupled to the ring gear of the second planetary gearset and the carrier assembly of the second planetary gearset is coupled to the ring gear of the third planetary gearset. In a different aspect, the ring gear of the third planetary gearset is coupled to the carrier assembly of the second planetary gearset, the ring gear of the fourth planetary gearset, the carrier assembly of the third planetary gearset, and the third stationary torque-transferring mechanism.

In another embodiment, an automatic transmission includes an input adapted to couple to a torque-generating mechanism and an output coupled to the input. The transmission also includes a first rotating torque-transferring mechanism and a second rotating torque-transferring mechanism, the first and second rotating torque-transferring mechanisms being independently coupled to the input. Moreover, a plurality of stationary torque-transferring mechanisms is disposed between the input and the output. The transmission further includes a first planetary gearset, a second planetary gearset, a third planetary gearset, and a fourth planetary gearset, where each gearset is coupled to one of the plurality of stationary torque-transferring mechanisms and includes a sun gear, a ring gear, and a carrier assembly. The ring gear of the fourth planetary gearset is coupled to the ring gear of the third planetary gearset.

In one aspect of this embodiment, the carrier assembly of the third planetary gearset is coupled to the output and the sun gear of the fourth planetary gearset. In another aspect, the input and output are disposed along the same centerline. In a different aspect, the carrier assembly of the first planetary gearset is coupled to the ring gear of the second planetary gearset and the carrier assembly of the second planetary gearset is coupled to the ring gear of the third planetary gearset. In a further aspect, the ring gear of the third planetary gearset is coupled to the carrier assembly of the second planetary gearset, the ring gear of the fourth planetary gearset, the carrier assembly of the third planetary gearset, and the third stationary torque-transferring mechanism. In a related aspect, the first rotating torque-transferring mechanism comprises an applied state and an unapplied state, where in the applied state the first rotating torque-transferring mechanism is coupled to the sun gears of the second and third planetary gearsets. In yet another related aspect, the second rotating torque-transferring mechanism comprises an applied state and an unapplied state, where in the applied state the second rotating torque-transferring mechanism is coupled to the carrier assembly of the second planetary gearset.

In a different embodiment of the present disclosure, a gear scheme is provided for an automatic transmission. The gear scheme includes a transmission input and a transmission output. The gear scheme also includes a first rotating torque-transferring mechanism and a second rotating torque-transferring mechanism, each being independently coupled to the transmission input. A plurality of stationary torque-transferring mechanisms is disposed between the transmission input and transmission output. The gear scheme further includes a first planetary gearset coupled to the first rotating torque-transferring mechanism, the first planetary gearset being coupled to one of the plurality of stationary torque-transferring mechanisms. A second planetary gearset is coupled to the first planetary gearset and the first rotating torque-transferring mechanism, the second planetary gearset being coupled to one of the plurality of stationary torque-transferring mechanisms. A third planetary gearset is coupled to the second rotating torque-transferring mechanism and the transmission output, the third planetary gearset being coupled to one of the plurality of stationary torque-transferring mechanisms. The gear scheme includes a fourth planetary gearset coupled to the third planetary gearset and one of the stationary torque-transferring mechanisms. The fourth planetary gearset includes an input and an output and the third planetary gearset includes an input and an output, the output of the third planetary gearset being coupled to the transmission output and the input of the fourth planetary gearset. Moreover, the output of the fourth planetary gearset is coupled to the input of the third planetary gearset.

In one aspect of this embodiment, the input of the third planetary gearset comprises a sun gear and a ring gear and the output of the third planetary gearset comprises a carrier assembly. The input of the fourth planetary gearset comprises a sun gear and the output of the fourth planetary gearset comprises a ring gear, where the ring gears of the third and fourth planetary gearsets are coupled to one another. In another aspect, the transmission input and transmission output are disposed on the same centerline. In a different aspect, the first rotating torque-transferring mechanism comprises an applied state and an unapplied state, where in the applied state the first rotating torque-transferring mechanism is coupled to a sun gear of the second planetary gearset and a sun gear of the third planetary gearset. In an alternative aspect, the second rotating torque-transferring mechanism comprises an applied state and an unapplied state, where in the applied state the second rotating torque-transferring mechanism is coupled to a carrier assembly of the second planetary gearset.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
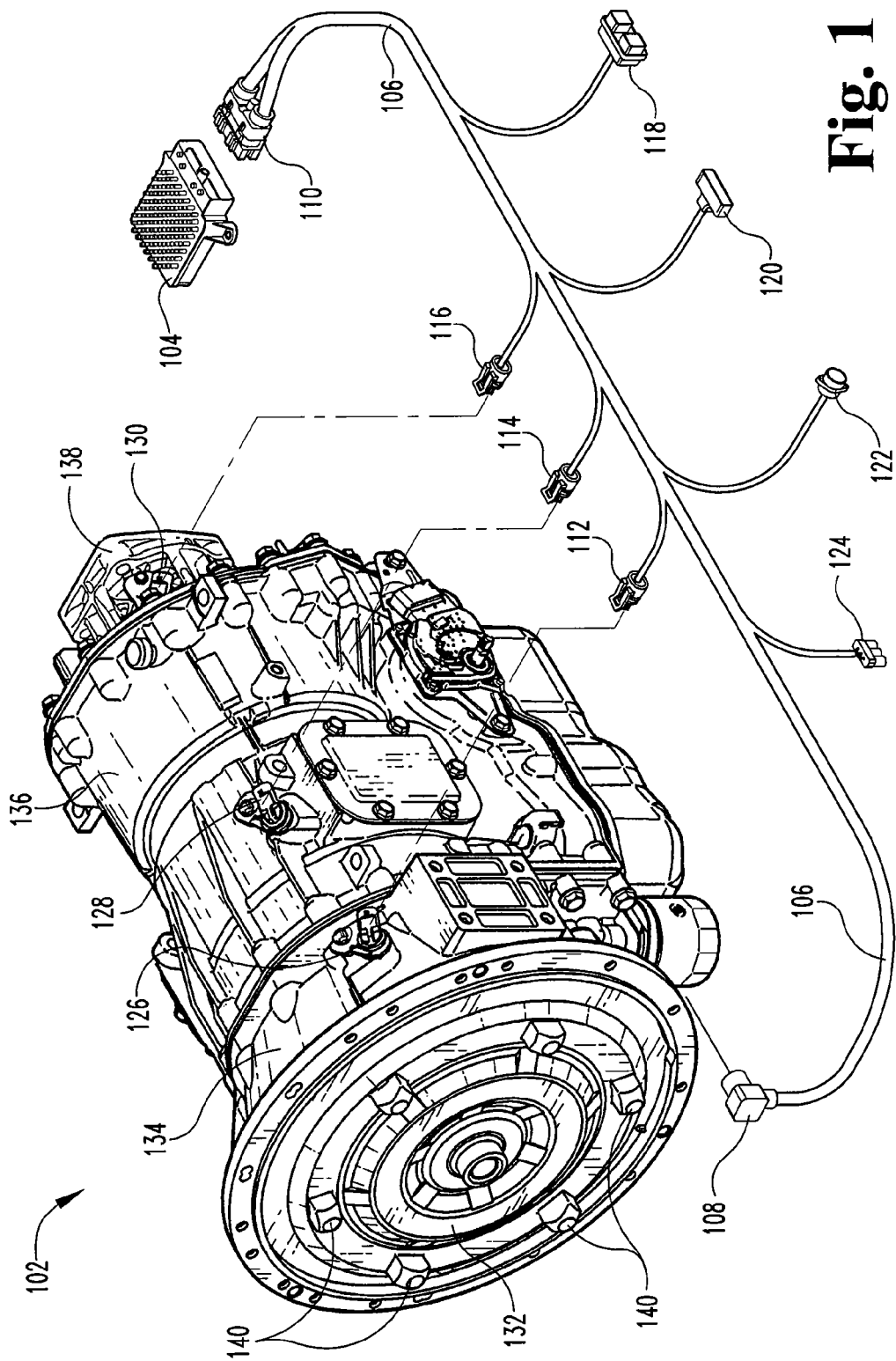
FIG. 1 is a perspective view of one embodiment of a transmission coupled to a controller via a wiring harness.

The present disclosure relates to a transmission with an improved gear scheme. With reference to FIG. 1, an exemplary embodiment of a transmission assembly is provided. A transmission 102 is shown in FIG. 1 with a controller 104, i.e., transmission control module ("TCM"). Software is downloaded to the TCM 104 and a wiring harness 106 couples the TCM 104 to the transmission 102. A conventional wiring harness 106 includes an outer plastic body that surrounds wires that extend from a TCM connector 110 at one end of the wiring harness 106 to a transmission connector 108 disposed at the opposite end of the wiring harness 106.

The wiring harness 106 can also include other connectors such as speed sensor connectors. In FIG. 1, for example, an engine or input speed sensor connector 112 couples to an engine or input speed sensor 126 of the transmission 102. Likewise, in an embodiment in which a torque converter is present, a turbine speed sensor connector 114 couples the wiring harness 106 to a turbine speed sensor 128 of the transmission 102. Also, an output speed sensor connector 116 of the wiring harness 106 couples to an output speed sensor 130 of the transmission 102. Other possible connectors of the wiring harness 106 include a data bus connector 120, a throttle position sensor (TPS) 124, a vehicle connector 118 (e.g., Vehicle Interface Module ("VIM") connector), and an alternative transmission harness mating connector 122. There can be additional connectors and/or harnesses in other embodiments.

As noted, the transmission 102 can include the engine or input speed sensor 126, turbine speed sensor 128, and output speed sensor 130. In this embodiment, the transmission 102 mounts to an engine (not shown) by coupling a converter housing 134 of the transmission 102 to a flywheel housing (not shown) of the engine (not shown). A torque-transferring mechanism 132, e.g., a torque converter or fluid coupling, of the transmission 102 can include a plurality of lugs 140 that couple to a flex plate (not shown) via flex plate bolts (not shown). For purposes of this embodiment, the torque-transferring mechanism 132 will be referred to as a torque converter. In some embodiments, a torque converter may not be present. In these embodiments, an input shaft of the transmission 102 is coupled to the engine via a clutch, for example.

In one embodiment, an internal combustion engine (not shown) can be coupled to the transmission 102 via the torque converter 132 (or input shaft for those embodiments without a torque converter). The internal combustion engine can be configured to rotatably drive an output shaft (not shown) of the engine that is coupled to the input (not shown) of the torque converter 132. The torque converter 132 can further include a turbine (not shown) that is coupled via splines to a turbine shaft (not shown) of the transmission 102. In turn, the turbine shaft (not shown) can be coupled to, or integral with, a rotatable input shaft (not shown) of the transmission 102. An output shaft (not shown) of the transmission 102 can be coupled to or integral with, and rotatably drives, a propeller shaft (not shown) that is coupled to a conventional universal joint (not shown). The universal joint (not shown) can be coupled to, and rotatably drives, a drive axle (not shown) having tires or wheels mounted thereto at each end. The output shaft (not shown) of the transmission 102 drives the tires in a conventional manner via the propeller shaft, universal joint and drive axle.

During operation, as the engine rotatably drives the torque converter 132, the engine or input speed sensor 126 detects the rotational speed of the torque converter 132. The torque converter 132 can include ribs or protrusions (not shown) that protrude from the surface of the torque converter 132 and which the engine or input speed sensor 126 measures during each revolution.

As shown in FIG. 1, the transmission 102 can also include a main case or housing 136 that encloses a gearbox, i.e., gears, synchronizers, brakes, dog clutches, clutch plates and reaction plates, a number of automatically selectable gears, planetary gear sets, hubs, pistons, shafts, and other housings. The transmission 102 can further include a turbine shaft (not shown) which can rotate various clutches or shafts in the transmission. A gear or tonewheel (not shown) can be coupled to the turbine shaft (not shown) such that the turbine speed sensor 128, which couples to the main case or housing 136, measures the rotational speed of the gear or tonewheel (not shown). Other transmissions can include alternative ways known to the skilled artisan for measuring turbine speed.

In one embodiment, the transmission 102 can include an output shaft (not shown) which is enclosed by a rear cover 138 of the transmission 102. To measure the output speed of the transmission 102, the output speed sensor 130 can couple to the rear cover 138. A smaller gear or tonewheel (not shown) can be coupled to the output shaft (not shown) such that the output shaft and gear or tonewheel rotate together. The output speed sensor 130 is aligned with the gear or tonewheel and measures the rotational speed of the output shaft.

Transmission shift schedules and other related instructions are included in software which is downloaded to the TCM 104. The TCM 104 can control the shifting of the transmission by electrically transferring instructions to the transmission such that certain actions are carried out by the synchronizers, brakes, clutches, dog clutches, pistons, etc. In one non-limiting embodiment, the TCM 104 is part of a transmission control circuit that can further include an electronic solenoid and valve assembly for controlling the engaging and disengaging of clutch assemblies, etc. Components within the transmission 102 can be activated electrically, mechanically, hydraulically, pneumatically, automatically, semi-automatically, and/or manually. The transmission control circuit is able to control the operation of the transmission to achieve desired performance.

Based on instructions in a transmission software program, the transmission control circuit (e.g., TCM 104) can select a shift schedule depending on a vehicle's driving condition and execute instructions contained in the software by sending signals through the wiring harness 106 to control the transmission 102. The TCM 104 can also receive measurement data from the transmission 102 such as, for example, input speed from the input speed sensor 126, turbine speed from the turbine speed sensor 128, and output speed from the output speed sensor 130. In an embodiment in which the transmission does not include a torque converter 132, the transmission may only have an input speed sensor 126 and output speed sensor 130. The TCM 104 can also calculate various parameters including transmission gear ratio or range, which is typically the ratio of input speed to output speed. In an embodiment in which the transmission 102 has a torque converter 132, the transmission gear ratio or range can also be determined by the ratio of turbine speed to output speed.

The TCM 104 can also receive accelerator pedal position (i.e., throttle percentage) from a throttle input source, which can be coupled to an engine control module (ECM) or vehicle control module (VCM) for transmitting throttle data over a data bus. Examples of a conventional data bus include J1708 data bus, J1939 data bus, IESCAN data bus, GMLAN, Mercedes PT-CAN. In addition, a Hardwire TPS (throttle position sensor) to TCM or Hardwire PWM (pulse width modulation) to TCM can be used. Information such as accelerator pedal position that is communicated over the data bus is not limited to a particular engine/transmission configuration. Instead, the data bus can be adapted to most vehicle setups.

Figure 2:
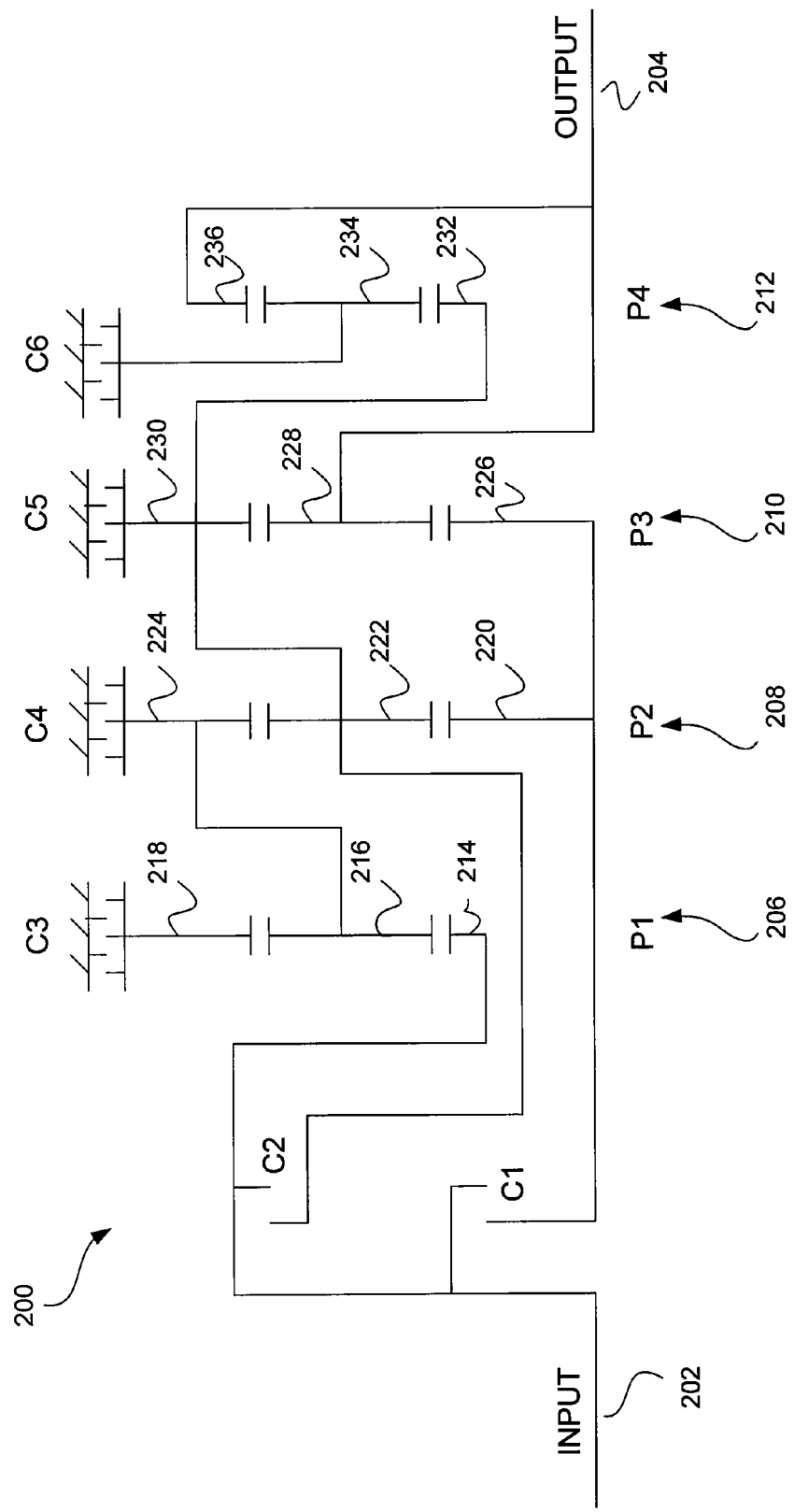
FIG. 2 is a first gear scheme for a seven speed automatic transmission.

With reference to FIG. 2, an exemplary gear scheme 200 is provided for transferring torque from an input 202 of the transmission to an output 204 thereof. As shown, the gear scheme 200 further includes a plurality of torque-transferring mechanisms. The plurality of torque-transferring mechanisms can include a pair of rotating clutches, i.e., C1 and C2, and four stationary clutches or brakes, i.e., C3, C4, C5, and C6. Each of the clutches or brakes can be arranged in a pack, for example, and include one or more plates. The plates can include friction material and thus comprise friction plates, whereas other plates can be disposed between the friction plates and are referred to as reaction plates.

The gear scheme 200 can also include a plurality of planetary gearsets. For example, in FIG. 2, the scheme 200 includes a first planetary gearset 206, a second planetary gearset 208, a third planetary gearset 210, and a fourth planetary gearset 212. For purposes of this disclosure, the first planetary gearset 206 can be referred to as a P1 planetary gearset. Likewise, the second, third, and fourth planetary gearsets can be referred to as P2, P3, and P4, respectively. Each planetary gearset can include a sun gear, a ring gear, and a carrier. For instance, the P1 planetary gearset 206 includes a P1 sun gear 214, a P1 carrier 216, and a P1 ring gear 218. The P2 planetary gearset 208 includes a P2 sun gear 220, a P2 carrier 222, and a P2 ring gear 224. Similarly, the P3 planetary gearset 210 includes a P3 sun gear 226, a P3 carrier 228, and a P3 ring gear 230. The P4 planetary gearset 212 includes a P4 sun gear 232, a P4 carrier 234, and a P4 ring gear 236. Each of the carriers can include a plurality of planet gears rotatably coupled thereto.

In FIG. 2, the lines connecting the different components can refer to or indicate paths through which torque is transferred. In addition, where the lines are broken (e.g., an "=" sign), this can refer to the coupling of two or more components (e.g., gears, splines, clutch, brakes, etc.) to one another in the gear scheme. For instance, the plurality of planet gears of the P1 carrier 216 are shown being coupled to the P1 sun gear 214 and the P1 ring gear 218 (e.g., in a planetary gearset arrangement, the P1 planet gears can be disposed around the P1 sun gear 214 while the P1 ring gear 218 surrounds both the planet gears and sun gear 214). When the C1 or C2 clutch is unapplied, torque cannot pass through either clutch. Similarly, when the C3 clutch or brake is applied, for example, the P1 ring gear 218 is held and cannot rotate. From this point forward in this disclosure, the C1 and C2 torque-transmitting mechanisms will be referred to as "clutches" and the C3-C6 torque-transferring mechanisms will be referred to as "brakes", but it is to be understood that these components may be different in alternative embodiments.

In the present disclosure, the gear scheme 200 is such that two clutches (or two brakes or one clutch and one brake) are applied to achieve a particular range or gear ratio. In other gear scheme embodiments, however, a range may be achieved by applying any combination of clutches or brakes (e.g., one clutch, three clutches, four clutches, etc.). In one particular embodiment, for example, a gear scheme can be defined such that a plurality of forward and reverse ranges, their respective gear ratio (or possible range of gear ratios), and the applied clutch and/or brake for achieving the respective range is as follows:

| Gear Range | Gear Ratio | Applied Clutches or Brakes |
| --- | --- | --- |
| F1 | 5.0-9.0 | C1 & C6 |
| F2 | 2.5-6.0 | C1 & C5 |
| F3 | 1.5-4.5 | C1 & C4 |
| F4 | 1.1-3.0 | C1 & C3 |
| F5 | 0.9-1.1 | C1 & C2 |
| F6 | 0.25-0.99 | C2 & C3 |
| F7 | 0.25-0.99 | C2 & C4 |
| R2 | (−3.0)-(−7.0) | C3 & C5 |
| R1 | (−7.0)-(−20.0) | C3 & C6 |

In the table above, "F1" refers to a first forward range, "F2" refers to a second forward range, etc. In addition, "R1" refers to a first reverse range and "R2" refers to a second reverse range. The combination of gear ratios, ranges, and applied clutches and brakes is only provided above as an illustrative example and is not intended to limit the present disclosure in any manner. One skilled in the art can appreciate different gear ratios and applying or unapplying different clutches and/or brakes. Moreover, other embodiments are possible in which additional or fewer ranges are possible. The gear ratio can also be adjusted as desired to accommodate a close ratio or wide ratio transmission. As is known, the difference between a close ratio and wide ratio transmission can be defined by the number of gear teeth on the various components of the planetary gearsets.

In the first gear scheme 200, the gear step between F1 and F2 may be too large for the shift to be performed automatically. Instead, the vehicle operator may have to manually shift to this higher numerical gear ratio from the F2 range to the F1 range with the throttle released. Similarly, the operator would have to manually shift from the F1 range to the F2 range. In addition, the F1 to F2 gear step may prevent the shift from being made with the torque converter lockup clutch applied, which can result in higher transmission heat generation.

Figure 3:
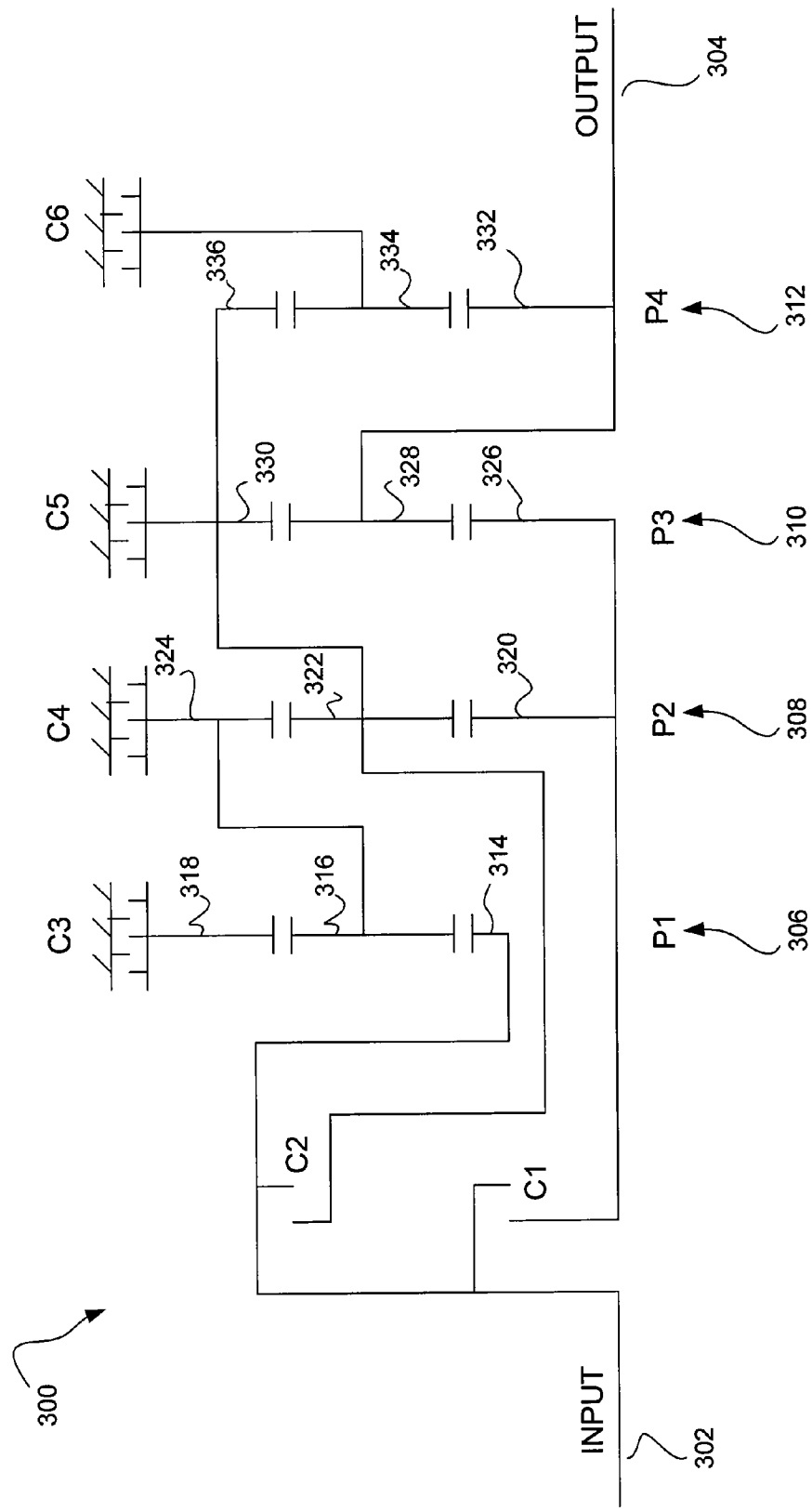
FIG. 3 is a second gear scheme for a seven speed automatic transmission.

Referring to FIG. 3, however, a different gear scheme 300 can be provided for a transmission for automatically shifting between the F1 and F2 ranges and the R1 and R2 ranges. Further, the F1 to F2 shift can be achieved with the torque converter lockup clutch applied.

In the second forward range, F2, of gear scheme 200, the torque path through the transmission is such that the C1 clutch and C5 brake are applied. When the C5 brake is applied, it can substantially lock the P3 ring gear 230 from rotating. With the P3 ring gear 230 stopped, the P3 sun gear 226 is an input of torque and the P3 carrier 228 is the output. As the skilled artisan understands, the P3 sun gear 226 and P3 carrier 228 rotate in the same direction.

Referring to the first forward range, F1, the C6 brake is applied. The C6 brake acts like a brake and substantially locks the P4 carrier 234 from rotating. Thus, as torque passes through the transmission, the P3 sun gear 226 and P3 carrier 228 continue rotating in the same direction as described above with respect to forward range F2. Torque passes through the P4 carrier 234 with the P4 ring gear 236 being the input and the P4 sun gear 232 being the output. As noted above, the P4 carrier is held by the C6 brake.

With the P4 ring gear 236 acting as the input, the P4 sun gear 232 rotates in the opposite direction as and at a greater speed than the P4 ring gear 236. The P4 sun gear 232 therefore drives the P3 ring gear 230 in the opposite direction of the P3 sun gear 226 which reduces the transmission rotational output speed since the P3 ring gear 230 reduces the output speed of the P3 carrier 228. Since the relationship of the speed ratio to the gear ratio is an inverse relationship, a reduced speed creates a greater gear ratio. For purposes of comparing the gear schemes of FIGS. 2 and 3, the first forward range F1 in gear scheme 200 can be referred to as HIGH numerical first ratio.

Turning to FIG. 3, a different embodiment of a gear scheme 300 is shown. Here, the gear scheme 300 provides a transmission input 302, a transmission output 304, and a different arrangement of the P4 planetary gearset 312. The transmission input 302 and transmission output 304 can be disposed along the same centerline or axis, as shown in FIG. 3. Moreover, the inputs and outputs of the P1 planetary gearset 306, P2 planetary gearset 308, and P3 planetary gearset 310 in the gear scheme 300 can be substantially similar to that of gear scheme 200. As shown, the gear scheme 300 can include two rotating torque-transferring mechanisms, C1 and C2, and four stationary torque-transferring mechanisms, i.e., C3, C4, C5, and C6. The gear scheme 300 also can include a first planetary gearset 306, a second planetary gearset 308, a third planetary gearset 310, and a fourth planetary gearset 312. The first planetary gearset 306, or P1 planetary gearset, can include a P1 sun gear 314, a P1 carrier 316, and a P1 ring gear 318. Likewise, the second planetary gearset 308, or P2 planetary gearset, can include a P2 sun gear 320, a P2 carrier 322, and a P2 ring gear 324. The third planetary gearset 310, or P3 planetary gearset, can include a P3 sun gear 326, a P3 carrier 328, and a P3 ring gear 330. Similarly, the fourth planetary gearset 312, or P4 planetary gearset, can include a P4 sun gear 332, a P4 carrier 334, and a P4 ring gear 336. Each of the carriers can include a plurality of planet gears rotatably coupled thereto.

The gear scheme 300 can produce similar ranges, gear ratios, and applied/unapplied clutches as described above with respect to gear scheme 200. Thus, in second forward range, F2, the C1 clutch and C5 brake can be applied. In this embodiment, the P3 ring gear 330 is held fixed by the C5 brake. Torque therefore passes through the P3 planetary gearset 310 via the P3 sun gear 326 and is output through the P3 carrier 328. The P3 sun gear 326 and P3 carrier 328 rotate in the same direction and thus transfer output torque to the transmission output 304.

In the first forward, F1, however, the gear scheme 300 differs over the gear scheme 200. In FIG. 3, the P4 carrier 334 is held fixed by the C6 brake. Similar to the second forward range, input through the P3 planetary gearset 310 is via the P3 sun gear 326. The P3 sun gear 326 transfers torque to the P3 carrier 328 which drives the transmission output 304. The P3 sun gear 326 and P3 carrier 328 rotate in the same direction and further drive the P4 sun gear 332. With the P4 carrier being held, the P4 sun gear 332 drives the P4 ring gear 336. The P4 ring gear 336 rotates in a direction opposite the P4 sun gear 332 and further drives the P3 ring gear 330 in the reverse direction. Although the P4 ring gear 336 is driven in the opposite direction by the P4 sun gear 332, it also rotates at a slower rotational speed than the P4 sun gear 332. Since the P4 ring gear 336 is rotating at a slower speed, the P3 ring gear 330 does so as well. Thus, with the P3 ring gear 330 rotating in the opposite direction compared to the P3 carrier 328, but at a slower speed, the overall speed reduction through the P3 planetary gearset 310 is less than in gear scheme 200. Consequently, the speed ratio is not reduced as significantly as gear scheme 200, and the gear ratio is substantially less than the HIGH numerical first ratio in gear scheme 200. For purposes of distinction, the first gear ratio of gear scheme 300 can be referred to as LOW numerical first ratio. This does not mean that the gear ratio for the first forward range in gear scheme 300 is small, but rather it is simply to note that the gear ratio in the first forward range in gear scheme 300 is smaller than the gear ratio in the first forward range in gear scheme 200.

In one aspect, the reduction in gear ratio can be significant such that the gear step between the first forward range and second forward range in gear scheme 300 is small enough that the shift therebetween can be achieved automatically and without releasing the throttle. In addition, the gear step can be small enough that the shift therebetween can be done while keeping the torque converter lockup clutch applied. This can result in lower transmission heat generation.

In gear schemes 200 and 300, the torque flow path between the transmission input 202, 302 and transmission output 204, 304 is similar for other forward ranges. For instance, in a third forward range F3, the C4 brake holds the P2 ring gear 324 from rotating. Torque therefore passes through the P2 planetary gearset 308 via the P2 sun gear 320 and is output through the P2 carrier 322. The P2 carrier 322 rotates in the same direction as the P2 sun gear 320 and is coupled to the P3 ring gear 330. Torque also passes through the P3 planetary gearset 310 as an input via the P3 sun gear 326. The P3 carrier 328 outputs torque to the transmission output 304 as shown.

In a fourth forward range F4, the C3 brake can hold the first ring gear 318. Torque can therefore enter the P1 planetary gearset 306 via the P1 sun gear 314 and output via the P1 carrier 316. The P1 carrier 316 is coupled to the P2 ring gear 324, and as a result torque passes through the P2 planetary gearset 308 through the P2 ring gear 324 (via the P1 carrier 316) and the P2 sun gear 320 (with C1 clutch applied). The P2 carrier 322 is the output of the P2 planetary gearset 308 and transfers torque to the P3 ring gear 330. Thus, torque passes through the P3 planetary gearset 310 via the P3 ring gear 330 (via the P2 carrier) and P3 sun gear 326 (with the C1 clutch applied). The P3 carrier 328 outputs torque to the transmission output 304.

In a fifth forward range F5, the C1 and C2 clutches are applied, but none of the stationary brakes are applied. Thus, torque from the transmission input 302 enters the P3 planetary gearset 310 via the P3 sun gear 326 (with the C1 clutch applied) and the P3 ring gear 330 (via the P2 carrier 322). With the P3 sun gear 326 and P3 ring gear 330 rotating at input speed, the P3 carrier 328 and transmission output 304 rotate at input speed thereby resulting in a gear ratio of approximately 1.0.

In a sixth forward range F6, the C2 clutch and C3 brake are applied. Unlike the previously described embodiments, the C1 clutch is not applied. The C3 brake holds the P1 ring gear 318. Torque therefore passes through the P1 planetary gearset 306 via the P1 sun gear 314 and is output through the P1 carrier 316. Torque passes through the P2 planetary gearset 308 through the P2 ring gear 324 (via the P1 carrier 316), P2 carrier 322 (with C2 clutch applied), and the P3 ring gear 330 (with the C2 clutch applied). This can overdrive the P2 sun gear 320 and the P3 sun gear 326 (i.e., causing both to rotate faster). With the P3 sun gear 326 being overdriven and the P3 ring gear rotating at input speed, the P3 carrier 328 and transmission output 304 are overdriven in the sixth forward range F6, thereby achieving a gear ratio less than 1.0.

In a seventh forward range F7, the C2 clutch and C4 brake are applied. In this range, the C4 brake holds the P2 ring gear 324. Torque is input to the P2 planetary gearset 308 directly from the transmission input 302 to the P2 carrier 322 and P3 ring gear 330. This condition overdrives the P2 sun gear 320 and P3 sun gear 326 to a larger degree than the sixth forward range F6. With the P3 sun gear 326 being overdriven to a greater degree (i.e., rotating faster) and the P3 ring gear 330 rotating at input speed, the P3 carrier 328 and transmission output 304 are overdriven in the seventh forward range F7 to a larger degree than in the sixth forward range F6.

In the above-described embodiments, the torque flow paths can differ depending on the gear scheme and which clutches or brakes are applied/unapplied. In one embodiment, the gear ratio in the first forward range is greater than the gear ratios for the second, third, fourth, fifth, sixth, and seventh forward ranges. The gear ratio in the seventh forward range is less than the gear ratios in the first, second, third, fourth, fifth, and sixth forward ranges.

The gear schemes 200, 300 are also capable of producing a first and second reverse ranges, i.e., R1 and R2 respectively. Again, however, due to the difference in configurations, the first gear scheme 200 and second gear scheme 300 are capable of producing different gear ratios in reverse. In one embodiment, the gear ratio in the second reverse range R2 is the same for both gear schemes, but the gear ratio in the first reverse range R1 is different. In an embodiment in which the number of gear teeth differs between the two gear schemes, the gear ratio in the first and second reverse ranges can be different.

Referring to FIG. 2, the second reverse range R2 can be achieved by applying the C3 and C5 brakes. Both of these brakes are stationary and hold ring gears from rotating. Specifically, the C3 brake holds the P1 ring gear 218 and the C5 brake holds the P3 ring gear 230. Since neither the C1 nor C2 clutches are applied, torque is transferred from the transmission input 202 to the first planetary gearset 206 via the P1 sun gear 214. Since the P1 ring gear 218 is held, the P1 carrier 216 rotates in the same direction as the P1 sun gear 214, albeit at a slower speed, and transfers torque to the P2 planetary gearset 208 via the P2 ring gear 224.

Since the C5 brake holds the P3 ring gear 230, the P2 carrier 222 cannot rotate. As such, the P2 sun gear 220 is the output of the P2 planetary gearset 208. Since the P2 carrier 222 is held, the P2 ring gear 224 and P2 sun gear 220 rotate in opposite directions relative to each other, but with the P2 sun gear 220 rotating at a higher speed than the P2 ring gear 224. With the P2 sun gear 220 now rotating in an opposite direction from the transmission input 202, the P2 sun gear 220 drives the P3 sun gear 226 in the opposite direction of the transmission input 202 as well. The P3 sun gear 226 continues to drive the P3 carrier 228 in the opposite direction of the transmission input 202, albeit at a slower speed, and thus the transmission output 204 (which is driven by the P3 carrier 228) rotates in the reverse direction.

In FIG. 2, the P3 carrier 228 is coupled to the P4 ring gear 236. The output of the P4 planetary gearset 212 is the P4 carrier 234, but because the P4 carrier 234 is not driving another element (i.e., since the C5 brake is holding the P3 ring gear 230 from rotation), there is no effect on the transmission output 204 by the P4 planetary gearset 212. As such, when the C3 and C5 brakes are applied in gear scheme 200, the transmission output 204 is in a second reverse range R2.

A first reverse range, R1, is achieved similarly as the second reverse range, R2, except the C6 brake is applied rather than the C5 brake. This results in the P4 carrier 234 being held instead of the P3 ring gear 230. With the P4 carrier being held, the P4 ring gear 236 is rotating in reverse and drives the P4 sun gear 232 and the P3 ring gear 230 in the forward direction (i.e., opposite the P4 ring gear 236). Given the P3 sun gear 226 is rotating in reverse, rotating the P3 ring gear 230 forward instead of holding it fixed can result in the P3 carrier 228 and transmission output 204 rotating slower in the reverse direction in the first reverse range R1 compared to the second reverse range R2. Therefore, the magnitude of the numerical gear ratio in the first reverse range, R1, is greater than the numerical gear ratio in the second reverse range, R2.

In the embodiment of FIG. 3, the gear scheme 300 can also provide a first reverse range R1 and a second reverse range R2. The torque path in the second reverse range R2 is substantially similar as described above in gear scheme 200. The gear ratio in the second reverse range R2 can be defined by the number of gear teeth in the P1 planetary gearset 306, P2 planetary gearset 308, and P3 planetary gearset 310. In the first reverse range R1, however, the coupling of the P3 planetary gearset 310 and P4 planetary gearset 312 can produce a gear ratio that is less than the gear ratio in first reverse range R1 for the first gear scheme 200.

Referring to FIG. 3, the P1 ring gear 318 is held by the C3 brake and the P4 carrier 334 is held by the C6 brake, which is similar to the first reverse range R1 of the first gear scheme 200. However, the different manner in which the P4 sun gear 232 and P4 ring gear 236 are connected in the gear scheme 200 relative to the gear scheme 300 results in numerical gear ratios in the first reverse range, R1, which are different for each gear scheme. In gear scheme 300, for example, the reverse direction input to the P4 planetary gearset 312 is the P4 sun gear 332 rather than the P4 ring gear 236 of gear scheme 200. This results in the output of the P4 planetary gearset 312 (e.g., P4 ring gear 336) and the P3 ring gear 330 rotating slower in the forward direction than that of the P3 ring gear 230 of gear scheme 200. Given the P3 sun gear 326 is rotating in reverse, the slower rotation of the P3 ring gear 330 in the forward direction than in gear scheme 200 results in the P3 carrier 328 and transmission output 304 rotating faster in the reverse direction than in gear scheme 200. Therefore, the magnitude of the numerical gear ratio in the first reverse range, R1, of gear scheme 300 is less than the magnitude of the numerical gear ratio of the first reverse range, R1, of gear scheme 200. The gear step between the first reverse range, R1, and second reverse range, R2, of gear scheme 300 is also less than that of gear scheme 200.

The gear step between the first reverse range, R1, and second reverse range, R2, can be reduced for the second gear scheme 300 regardless of whether a close ratio or wide ratio transmission is being used. Thus, the transmission can automatically shift between the two reverse ranges without requiring any interaction on behalf of the vehicle operator, e.g., such as releasing the throttle and/or bringing the vehicle to a stop first.

In those embodiments in which the shift between the first forward range and second forward range can be achieved automatically, another advantage can include improved life of the planetary gearsets. When the gear step is large between ranges, the gear teeth in the planetary gearsets are subject to higher loads and wear more quickly. However, smaller gear steps can improve the durability and robustness of the gear teeth and thus extend the life of the planetary gearsets. This can also lead to less downtime for the vehicle as fewer repairs are required.

In addition, a lockup clutch in a torque converter can be applied between a first forward range and second forward range due to a smaller gear step. This can improve the transmission efficiency, reduce transmission heat generation, and improve performance during shifts. As a result, the improved gear scheme 300 can improve transmission shift quality, wear and performance over a transmission arranged in accordance with the second gear scheme 200.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An automatic transmission, comprising:
an input adapted to couple to a torque-generating mechanism;
an output coupled to the input;
a first rotating torque-transferring mechanism disposed along a first torque path, the first rotating torque-transferring mechanism being coupled to the input;
a second rotating torque-transferring mechanism disposed along a second torque path, the second rotating torque-transferring mechanism being coupled to the input independent of the first torque-transferring mechanism;
a first stationary torque-transferring mechanism, a second stationary torque-transferring mechanism, a third stationary torque-transferring mechanism, and a fourth stationary torque-transferring mechanism, each of the stationary torque-transferring mechanisms being disposed between the input and the output; and
a first planetary gearset, a second planetary gearset, a third planetary gearset, and a fourth planetary gearset, where each gearset includes a sun gear, a ring gear, and a carrier assembly;
wherein, the carrier assembly of the third planetary gearset is coupled to the output and the sun gear of the fourth planetary gearset,
wherein, the carrier assembly of the first planetary gearset is coupled to the ring gear of the second planetary gearset; and
the carrier assembly of the second planetary gearset is coupled to the ring gear of the third planetary gearset.

2. The automatic transmission of claim 1, wherein the ring gear of the fourth planetary gearset is coupled to the ring gear of the third planetary gearset.

3. The automatic transmission of claim 2, wherein the ring gear of the third planetary gearset is coupled to the carrier assembly of the second planetary gearset, the ring gear of the fourth planetary gearset, the carrier assembly of the third planetary gearset, and the third stationary torque-transferring mechanism.

4. An automatic transmission, comprising:
an input adapted to couple to a torque-generating mechanism;
an output coupled to the input;
a first rotating torque-transferring mechanism and a second rotating torque-transferring mechanism, the first and second rotating torque-transferring mechanisms being independently coupled to the input;
a plurality of stationary torque-transferring mechanisms disposed between the input and the output; and a first planetary gearset, a second planetary gearset, a third planetary gearset, and a fourth planetary gearset, where each gearset is coupled to one of the plurality of stationary torque-transferring mechanisms and includes a sun gear, a ring gear, and a carrier assembly;

wherein, the ring gear of the fourth planetary gearset is coupled to the ring gear of the third planetary gearset;

wherein, the carrier assembly of the first planetary gearset is coupled to the ring gear of the second planetary gearset; and the carrier assembly of the second planetary gearset is coupled to the ring gear of the third planetary gearset.

5. The automatic transmission of claim 4, wherein the carrier assembly of the third planetary gearset is coupled to the output and the sun gear of the fourth planetary gearset.

6. A gear scheme for an automatic transmission, comprising:

a transmission input and a transmission output;

a first rotating for torque-transferring mechanism and a second rotating torque-transferring mechanism, each being independently coupled to the transmission input;

a plurality of stationary torque-transferring mechanisms disposed between the transmission input and transmission output;

a first planetary gearset coupled to the first rotating torque-transferring mechanism, the first planetary gearset being coupled to one of the plurality of stationary torque-transferring mechanisms;

a second planetary gearset coupled to the first planetary gearset and the first rotating torque-transferring mechanism, the second planetary gearset being coupled to one of the plurality of stationary torque-transferring mechanisms;

a third planetary gearset coupled to the second rotating torque-transferring mechanism and the transmission output, the third planetary gearset being coupled to one of the plurality of stationary torque-transferring mechanisms; and a fourth planetary gearset coupled to the third planetary gearset and one of the stationary torque-transferring mechanisms;

wherein, the fourth planetary gearset includes an input and an output and the third planetary gearset includes an input and an output, the output of the third planetary gearset being coupled to the transmission output and the input of the fourth planetary gearset;

further wherein, the output of the fourth planetary gearset is coupled to the input of the third planetary gearset;

wherein the first rotating torque-transferring mechanism comprises an applied state and an unapplied state, where in the applied state the first rotating torque-transferring mechanism interconnects the transmission input to a sun gear of the second planetary gearset and a sun gear of the third planetary gearset.

* * * * *